United States Patent Office 3,574,655
Patented Apr. 13, 1971

3,574,655
METHOD FOR PREPARING FOAMED SILICATE GLASS
Aaron Goldsmith, Sepulveda, Calif., assignor to Lockheed Aircraft Corporation, Burbank, Calif.
No Drawing. Filed May 4, 1967, Ser. No. 635,998
Int. Cl. C04b 33/00
U.S. Cl. 106—402
12 Claims

ABSTRACT OF THE DISCLOSURE

Method of making foamed glass insulation by forming a mixture of a finely divided vaporizable metal with at least two glasses. The first glass becomes fluid at or near the boiling point of the metal and the second glass is miscible with the first glass to raise its viscosity. The entire mixture is heated to vaporize the metal and form cells within the molten glass, after which the viscosity of the glass is increased and the glass is cooled to solidification.

---

This invention relates to foamed glass insulation and a method for its manufacture. More specifically, the invention relates to a method for preparing foamed glass insulation, which employs a mixture of glasses in conjunction with a finely divided vaporizable metal.

Foamed glass insulation as such has been previously described in the technical literature. As disclosed by C. G. Munters in U.S. Pat. 2,012,617, Aug. 27, 1935, foamed glass may be prepared by the introduction of a finely divided metal such as cadmium, zinc, or the like, into a molten mass of glass, slag or like material. On vaporization of the finely divided metal, a large number of cells are formed within the mass of molten material. On cooling of the molten material, the metal vapors within the cells condense to create a vacuum within the cells. In order to maintain the cell structure within the glass during cooling, the Munters' patent discloses cooling of the glass under vacuum so as to maintain an external pressure on the glass which is equal to or less than the vapor pressure of the metal vapor within the cells.

In practice, the process of the Munters' patent has not been satisfactory because of the difficulty in controlling and maintaining the cell structure within the glass during cooling through use of a vacuum. As the molten glass is cooled, the tendency of the cells within the glass is to contract as the vapor pressure of the metal within the cells decreases with decreasing temperature. The tendency of the cells to contract is not effectively controlled merely by cooling of the glass in the presence of a vacuum. As will be appreciated, the external pressures of vapor-filled cells within the molten glass are dependent upon a number of factors other than the pressure of the atmosphere surrounding the glass. In practice, the temperature of the glass is not completely uniform throughout. The temperature of the glass will vary from point to point with the result that the viscosity and surface tension of the glass will likewise vary from point to point within the glass. These variations will affect the tendency of individual cells to contract with the result that the cells will not contract uniformly throughout the glass during cooling. The Munters' process does not compensate for non-uniformity of temperatures within the glass since it applies a vacuum to the entire glass. This treatment tends to reduce the pressure on all of the cells which does nothing to compensate for non-uniformity of conditions as between individual cells within the glass.

Due to the various factors other than the pressure of the surrounding atmosphere which affect the cell structure during cooling of the glass, the Munters' process does not produce a foamed glass insualtion having a sufficiently uniform cell structure. Moreover, the difficulties involved in conducting a large scale high temperature manufacturing operation under conditions of a near vacuum are substantial and make the Munters' process unattractive in terms of its cost.

In solving the difficulties of the prior art as exemplified by the Munters' process, it is an object of the invention to provide a process which utilizes a vaporizable metal, a low temperature glass which is molten at the vaporization temperature of the metal, and at least one additional glass which dissolves in the molten low temperature glass to increase its viscosity.

A further object is to provide a process in which a finely divided vaporizable metal and a mixture of two or more finely divided glasses are heated to a temperature at which the glasses are molten and the metal is vaporized to form cells within the molten glass, after which the molten glass is cooled and is substantially solidified at a temperature above the temperature at which melting of the glass took place during heating of the mixture.

Additional objects will appear from a reading of the specification and claims which follow.

In forming a foamed glass according to my invention, I first prepare a mixture of a finely divided vaporizable metal with at least two glasses. One of the glasses, which is termed the low temperature glass, becomes a liquid at a temperature which is slightly below the boiling point of the vaporizable metal. Inasmuch as glasses do not have sharp melting points, but rather exist in the solid state as super-cooled liquids, it is convenient to describe the low temperature glass in terms of its viscosity in the region of the boiling point of the vaporizable metal. The low temperature glass has a viscosity in the order of about $10^5$ stokes at the boiling point of the vaporizable metal or at temperatures slightly below its boiling point, e.g., up to about 50° F. below the boiling point.

In addition to the low temperature glass, I also employ at least one additional glass which dissolves in the low temperature glass at a temperature in the order of 100–200° F. above the boiling point of the vaporizable metal to, in effect, form a new glass whose viscosity is from $10^2$ to $10^4$ stokes greater than the viscosity of the low temperature glass. Due to the increased viscosity of the glass, the cells which are filled with metal vapor do not have as great a tendency to contract during cooling of the molten glass. This provides a foamed glass insulation material having a generally more uniform cell structure and a lower density.

Various vaporizable metals may be employed in forming a foamed glass insulation material according to my method. As an example, I may use finely divided bismuth, zinc, or cadmium, or mixtures of these metals or their alloys. In addition, I can employ such metals as aluminum, lead, manganese, silver, etc. The choice of a particular vaporizable metal will, of course, have a great affect upon the glasses which are employed in forming the foamed glass insulation. If, for example, the vaporizable metal is one having a very high boiling point, such as manganese, this will require the use of high melting glasses having the required viscosity at the boiling point of manganese. Conversely, if the vaporizable metal is one having a relatively low boiling point, such as cadmium, the glasses employed will have correspondingly low melting points so as to have the desired viscosity at the boiling point of cadmium. A preferred metal for the practice of my process is zinc since it is easily ground, readily available, and its boiling point of 906° C. under atmospheric conditions provides a foamed glass insulation which is quite suitable for most purposes.

On cooling of the molten glass to a temperature below the boiling point of the vaporizable metal, the metallic vapor within the cells condenses to create a near vacuum within the cells. On further cooling of the glass, the metal solidifies to form a metallic coating on the cell walls. By virtue of the near vacuum within the cells and the metallic coating on the cell walls, the resulting foamed glass is an excellent insulating material. The near vacuum within the cells greatly reduces heat transfer through convection while the reflective metal coating on the cell walls greatly reduces heat transfer through radiation.

Needless to say, the glasses which I employ in my process are substantially unreactive with the vaporizable metal which is used to form the cells. By way of illustration, it has been found that zinc reacts with certain lead oxide and boron oxide containing glasses to form a glass bead. Such reaction can prevent the formation of a foamed glass since the reaction to form glass beads consumes the zinc such that it is not available for vaporization to form cells. A minor degree of reaction can, of course, be tolerated between the vaporizable metal and the glasses providing that the degree of reaction is not sufficient to prevent or inhibit the foaming of the glass through vaporization of the metal.

The glass or glasses, in addition to the low temperature glass, are, in general, termed high temperature glasses in that they become fluid at a temperature above that at which the low temperature glass becomes fluid. This need not be the case, however. I have found, for example, I can use a glass mixture in which each of the glasses is a low-melting eutectic. On heating of the glass mixture above the eutectic points of the glasses, they become soluble in each other to form a new glass having a melting point or viscosity which is higher than that of either of the two eutectic glasses. This can be readily visualized in terms of a temperature-composition diagram in which the liquidus line has two minimum points corresponding to the two eutectic glasses, which minimum points are separated by a maximum point in which the liquidus line rises sharply from one eutectic point, achieves a maximum, and descends sharply to the next eutectic point.

In practicing my process, I begin by mixing the finely divided vaporizable metal with the finely divided glasses. The particle size of the metal and the glasses can be varied in the practice of my process. By way of illustration, suitable particle sizes can range from about 100 to about 400 mesh. Following the mixing of the finely divided metal and the glasses to a state of substantial homogeneity, I place the mixture in a mold corresponding to the shape, such as a flat sheet, which I desire to form. Following this, the mold is placed in a furnace and is heated to a temperature at which the low temperature glass melts. As described previously, the low temperature glass at this point has a viscosity of about $10^5$ stokes. Due to the fluidity of the low temperature glass, it flows to substantially surround the finely divided metal particles. On further heating, the metal vaporizes and increases its volume by a factor up to 1,000 or more. The metallic vapor, as it expands, forms a bubble or cell which is surrounded by the fluid low temperature glass. Heating is continued to a temperature in the order of 100 to 200° F. above the vaporization temperature of the metal at which point the low temperature glass is miscible with the other glass or glasses. On mixing of the low temperature glass with the other glass or glasses, a new glass results which has a much higher viscosity than that of the low temperature glass. Following this, the glass is cooled. During cooling, there is, of course, some contraction of the cells within the glass due to the decrease in the vapor pressure of the metal within the cells as the temperature is decreased. Due, however, to the increased viscosity of the glass, the glass sets up or becomes substantially rigid at a temperature which is higher than the temperature at which the low temperature glass became fluid, i.e., attained a viscosity of $10^5$ stokes. This results in a foamed glass having a generally more uniform cellular structure and a decreased density.

As described, my process can be modified in various respects without departing from the spirit of my invention. For example, the finely divided vaporizable metal can first be coated with the low temperature glass and then mixed in finely divided form with the other glass or glasses. Also, if desired, the heating of the glass can be conducted under either pressure or vacuum to control the boiling point of the vaporizable metal. Further, the heating can be carried out in the presence of a controlled atmosphere, such as oxygen or carbon dioxide, so as to limit or preclude the presence of nitrogen within the cellular glass product. The expansion of the finely divided metal on vaporization will, in itself, act to displace nitrogen from the cells. However, other additional means, such as use of a controlled atmosphere or heating of finely divided glasses in vacuum prior to their use in my process, may be employed to limit the presence of nitrogen in the glass. Preferably nitrogen is excluded from the glass since its presence within the cells increases heat transfer through the cellular glass product by convection through the nitrogen. In certain instances, the vaporizable metal can serve a dual function in forming cells by vaporization and also by acting as a getter. When acting as a getter, the vaporizable metal reacts with gas which is entrapped within the glass.

Another modification of my process involves use of a multicomponent glass system, such as a ternary or quaternary mixture, one component of which serves as the low temperature glass, as described previously, in which the other components become miscible during the heating process to form a new glass having a viscosity which is $10^2$ to $10^4$ stokes greater than that of the low temperature glass.

To further illustrate my invention, I have prepared the following examples in which all parts and percentages are by weight unless otherwise indicated.

EXAMPLE I

Ten parts of water glass (A) containing 25% sodium oxide and 74% of silicon dioxide were mixed with ten parts of a bottle glass (B) containing 17% sodium oxide, 5% calcium oxide, 3.6% magnesium oxide, 0.4% aluminum oxide, and 74% silicon dioxide. To the mixture was added finely divided zinc in an amount to give a concentration of 5% by weight of the mixture. The finely divided mixture was then placed in a pan which was in turn placed in a furnace. The furnace, which contained air, was then heated to 1700° F. after which the glass was cooled to give a cellular glass insulation material.

EXAMPLE II 10 parts of a glass (C) containing 0.6% potassium oxide, 4.5% sodium oxide, 8.8% calcium oxide, 7.9% barium oxide, 15.8% zinc oxide, 10.2% zirconium oxide, 0.9% aluminum oxide, 9.9% boron oxide, and 39.5% silicon dioxide was mixed in finely divided form with 10 parts of a glass (D) containing 3.8% potassium oxide, 9.0% sodium oxide, 6.5% calcum oxide, 10.2% zinc oxide, 13.8% aluminum oxide, 5.0% boron oxide and 51.7% silicon dioxide. Finely divided zinc in an amount equal to 3% by weight of the mixture was added and the mixture was blended to substantial homogeneity. It was then placed in a pan and heated in a furnace, as described in Example I, to a temperature of 1800° F., after which is was cooled to give a foamed glass insulation material.

In a further experiment, I blended equal parts of glass (D), as described in Example II, with equal parts of glass (B), as described in Example I. Finely divided zinc was added to the mixture in an amount equal to 3% by weight and the mixture was heated to 1675° F. and then cooled to provide a cellular glass insulation.

Still another foamed glass was prepared by heating to 1700° F. a mixture of equal parts of glass (B) with equal parts of a glass (E) containing 1.4% potassium oxide, 0.3% sodium oxide, 0.1% calcium oxide, 67.8% lead oxide, 2.3% aluminum oxide and 28.1% silicon dioxide with 5% by weight of the mixture of finely divided zinc. Also, a foamed glass was prepared by heating to 1675° F. a mixture of equal parts of glass (B) with equal parts of glass (F) containing 16.7% sodium oxide, 0.2% calcium oxide, 0.8% magnesium oxide, 5.9% aluminum oxide, and 76.4% silicon dioxide together with finely divided zinc in an amount equal to 4.5% by weight of the mixture. The procedures employed in making the above foamed glasses was that described in Examples I and II.

As described in the foregoing specification and examples, my invention provides a novel method of making a cellular glass insulation which is applicable to various types of glasses and various vaporizable metals. The foamed glass insulation produced by my process functions very well as an insulation material at temperatures which are not sufficient to revaporize the metal contained in the cells within the glass. Thus, when zinc is employed as the vaporizable metal forming the foamed glass, the glass will insulate very well at temperatures below about 720° F., at which point the vapor pressure of zinc becomes 50 microns. On reaching a vapor pressure of 50 microns, the zinc vapor within the cells begins to conduct heat and the insulating value of the material decreases. When employing a higher boiling metal in forming the foamed glass, such as bismuth, the foamed glass insulation may be used at higher temperatures. Bismuth has a boiling point of 1410° C. and does not have a vapor pressure of 50 microns until 1400° F.

In addition to forming foamed glass insulation according to my method. I may also employ my method to form foamed ceramic insulation. The distinction between glasses and ceramics relates primarily to softening temperature, the ceramics softening at much higher temperatures than the glasses. On employing my process to form a foamed cearmic insulation material, a high boiling metal would be employed, whose boiling point would be commensurate with the temperature at which the low temperature ceramic ingredient became suitably fluid to encapsulate the vaporizable metal prior to vaporization.

What is claimed is:

1. A process for preparing a foamed glass insulation material, said process comprising forming a mixture of a finely divided vaporizable metal, selected from the group consisting of bismuth, zinc, cadmium, their alloys and mixtures thereof, with a low temperature silicate glass whose viscosity is in the order of about $10^5$ stokes at the boiling point or slightly below the boiling point of said vaporizable metal, and a second silicate glass or glasses which are miscible with said low temperature glass in its molten state to raise the viscosity of said low temperature glass, heating said mixture to a temperature in excess of the boiling point of said vaporizable metal so as to form cells of vaporized metal which are surrounded by said low temperature glass, continuing the heating until said other glass or glasses become miscible in said low temperature glass to raise its viscosity, and cooling the molten glass mixture to the point of solidification at a temperature which is higher than the temperature at which said low temperature glass had a viscosity of about $10^5$ stokes during said heating.

2. The process of claim 1 wherein said vaporizable metal is zinc or a zinc alloy.

3. The process of claim 1 wherein said other glass or glasses are miscible in said low temperature glass at a temperature in the order of about 100° F. to about 200° F. above the boiling point of said vaporizable metal.

4. The process of claim 3 wherein the viscosity of said low temperature glass is increased in an amount from about $10^2$ to about $10^4$ stokes on mixing with said other glass or glasses.

5. The process of claim 1 wherein said finely divided vaporizable metal is first coated with said low temperature glass and is then mixed with said other glass or glasses prior to heating.

6. The process of claim 1 wherein said low temperature glass and said second glass or glasses are in finely divided form.

7. The process of claim 1 wherein said process is carried out in the presence of a controlled atmosphere so as to limit or exclude the presence of nitrogen in the foamed glass insulation material.

8. A foamed glass insulation material having a generally uniform cellular structure, as prepared by the method set forth in claim 1.

9. A process for preparing a foamed glass insulation material, said process comprising forming a mixture of finely divided zinc or zinc alloy with a low temperature silicate glass whose viscosity is in the order of $10^5$ stokes at the boiling point or slightly below the boiling point of zinc, and a second silicate glass or glasses which are miscible with said low temperature glass in its molten state to raise the viscosity of said low temperature glass in an amount from about $10^2$ to about $10^4$ stokes, heating said mixture to a temperature in excess of the boiling point of zinc so as to form cells of vaporized zinc which are surrounded by said low temperature glass, continuing the heating to a temperature in the order of about 100° F. to about 200° F. above the boiling point of zinc, at which point said other glass or glasses become miscible in said low temperature glass to raise its viscosity, and cooling the molten glass mixture to the point of solidification at a temperature which is higher than the temperature at which said low temperature glass had a viscosity of about $10^5$ stokes during said heating.

10. The process of claim 9 wherein said process is carried out in the presence of a controlled atmosphere so as to limit or exclude the presence of nitrogen in the foamed glass insulation material.

11. The process of claim 9 wherein said low temperature glass and said second glass or glasses are in finely divided form.

12. A foamed glass insulation material having a generally uniform cellular structure, as prepared by the method set forth in claim 9.

References Cited

UNITED STATES PATENTS

| | | | |
|---|---|---|---|
| 2,693,668 | 11/1954 | Slayter | 106—53X |
| 3,199,992 | 8/1965 | Moffitt | 106—39 |
| 2,012,617 | 8/1935 | Munters | 106—40 |
| 2,966,421 | 12/1960 | Zimmerman et al. | 106—40 |
| 3,174,870 | 3/1965 | Connelly et al. | 106—40 |
| 3,184,320 | 5/1965 | Michael | 106—48 |
| 3,207,588 | 9/1965 | Slayter et al. | 106—40X |
| 3,256,105 | 6/1966 | Alford et al. | 106—40 |

HELEN M. McCARTHY, Primary Examiner

W. R. SATTERFIELD, Assistant Examiner

U.S. Cl. X.R.

65—24; 106—40R; 252—378